May 16, 1961  V. R. FRANER  2,984,596
LABEL TAPE AND METHOD OF APPLYING
SAME TO A RUBBER ARTICLE
Filed Aug. 1, 1956
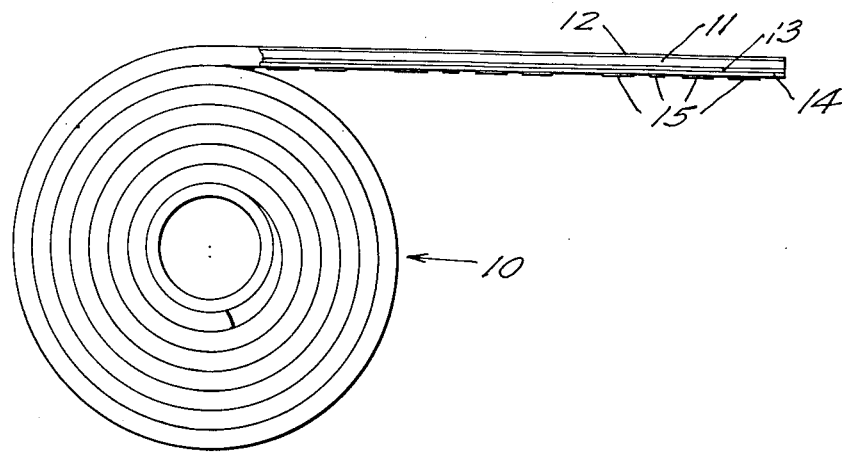
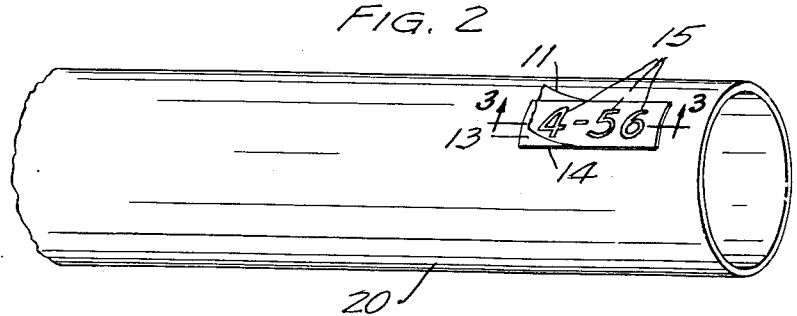
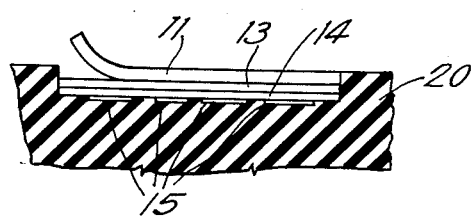
INVENTOR
VICTOR R. FRANER
BY
Carpenter, Abbott, Coulter & Kinney
ATTORNEYS

United States Patent Office 2,984,596
Patented May 16, 1961

2,984,596

LABEL TAPE AND METHOD OF APPLYING SAME TO A RUBBER ARTICLE

Victor R. Franer, Roseville, Minn., assignor to Minnesota Mining and Manufacturing Company, a corporation of Delaware Filed Aug. 1, 1956, Ser. No. 601,562

8 Claims. (Cl. 154—95)

This invention relates to methods of labelling rubber articles and to label tapes whereby rubber articles may be economically provided with attractive permanent labels.

Rubber articles have heretofore been labelled by means of direct printing, stenciling, decalcomania transfers, adhesive tags and the like, but such markings lack permanence when subjected to abrasion or weathering. For direct printing and stenciling, inks formulated of vulcanizable compositions and applied to "green" or unvulcanized rubber articles become firmly bonded thereto upon vulcanization. Since the unvulcanized rubber articles are hard to handle and do not normally lend themselves to direct printing, vulcanizable inks are sometimes applied by decalcomania transfer procedures. By either procedure, the marking is far from permanent in the face of abrasive or weathering action.

Where greater durability is required, labelling has generally been accomplished either by embossing the article itself or by embossing and vulcanizing a separate piece of rubber in contact with the article being marked. Embossing is relatively expensive, and when changes in markings are desired, the cost can become excessive. It may, for example, be desired to label rubber tubing with a trade name and size, date or other code numbers or with distinctive colorful coding patterns. Since code data may have to be changed with relative frequency in the manufacture of a single item, embossing procedures lack flexibility, requiring a separate die or die insert for each mark. In addition, embossed marks are unsuitable where protrusions in the surface of the article, e.g., of a rubber basketball or football, cannot be countenanced; nor is embossing feasible when rubber articles are vulcanized without the use of a press.

I have now devised a label tape whereby rubber articles may be economically provided with substantially permanent abrasion-resistant markings in contrasting color or colors. The label provided by the novel tape undergoes the rigors of vulcanization to yield a hard, tack-free marking of excellent clarity. The label is characterized by extraordinary resistance to abrasion and weathering and by subtle thinness such that it may be applied to a surface without altering the character of that surface and without being subject to edge lifting by bodies in sliding contact with such surface. The novel label tape is especially noteworthy for its ability to provide small numbers of articles with a unique label at minimum cost, allowing continual changes in marking without significant sacrifice in economy.

The structure of a specific embodiment of the novel label tape of this invention is illustrated in the accompanying drawing in which:

Figure 1 shows in side elevation a roll of printed tape wound directly upon itself with the structure of the tape shown for purposes of clarity only in the portion of the tape drawn from the roll;

Figure 2 is a fragmentary perspective view of a rubber tube to which a label from the roll of tape illustrated in Figure 1 has been applied; and Figure 3 is a schematic sectional view taken at 3—3 of Figure 2 but on an enlarged scale.

Referring to Figure 1, in which the thickness dimensions of the label tape are greatly exaggerated, a roll of tape 10 has a disposable carrier web 11, the back side of which is provided with a low-adhesion surface coating 12. The front surface of the carrier web 11 is coated with a thin non-tacky transparent vulcanizable resinous film 13 which after undergoing the conditions of vulcanization presents a sleek, transparent, permanent protective skin. Adhered in turn to the resinous film 13 is a transparent, slightly tacky, ink-receptive, vulcanizable rubbery bonding layer 14 which together with the resinous protective layer comprises the label structure. Figure 1 also shows inked indicia 15 of a vulcanizable ink, preferably of a color or colors chosen to contrast with rubber articles to be labelled.

As shown in Figure 2, a rubber tube 20 may be provided with a permanent marking by cutting off a label from the roll of tape 10 of Figure 1, adhering it to the "green" or unvulcanized tube 20 by means of its slightly tacky rubbery bonding layer 14, subjecting the whole to conditions sufficient to vulcanize rubber, and removing the carrier web 11 to expose the protective skin 13. Since both the bonding layer 14 and protective skin 13 are transparent after undergoing vulcanizing conditions, the inked indicia 15 stand out against the contrasting background presented by the tube 20.

The structure of the vulcanized label-bearing tube 20 is shown schematically in Figure 3. The rubbery layer 14 bonds the label structure over the inked indicia 15 against the tube 20, and the resinous protective layer 13 presents an abrasion-resistant outer surface after removal of the carrier web 11.

The label tape illustrated in the drawings has been fabricated using as the carrier web 11 a film of regenerated cellulose of about 0.0017 inch thickness, such as sold presently by E. I. duPont de Nemours under the designation "600 PUT 76 Cellophane." The carrier web 11 had previously been provided on one side with an ultra-thin low-adhesion backsize coating 12 consisting of the copolymer of about 60 parts octadecyl acrylate and 40 parts by weight of acrylic acid. The other side of carrier web 11 was coated with a solution obtained by diluting with toluene to 15 percent solids "Pliolite S–7 type 30," a product of the Goodyear Rubber Company marketed as a 30 percent solids solution in toluene of a copolymer of 30 parts butadiene and 70 parts styrene and having a viscosity of 2000–4000 centipoises at 70° F. and a specific gravity of 0.915. The coating of the diluted solution was dried at about 160° F. for about half a minute to yield a resinous protective layer 13 having a dry weight of about 1.5 grains per 24 square inches.

The vulcanizable rubbery bonding layer 14 was formed of the following ingredients in the proportions stated:

Part A:

| | Parts by weight |
|---|---|
| Light crepe natural rubber | 100 |
| Antioxidant ("Flectol H") | 2 |
| Benzothiazyl disulfide ("Altax") | 1.5 |
| Stearic acid | 1 |
| Tetraethyl thiuram disulfide ("Ethyl tuads") | 0.3 |
| Sulfur | 1.5 |

Part B:

| | |
|---|---|
| Polymerized beta-pinene resin ("Piccolyte S–115") | 5.5 |
| Ethanol | 15 |
| Heptane | 640 |

"Flectol H" is thought to be a condensation product of acetone and aniline melting at 120° C.

The ingredients of Part A were thoroughly blended on a rubber mill for about 20 minutes at a mill roll temperature of about 120°F. The milled stock was then cut into small pieces. Meanwhile, the resin of Part B was dissolved in the heptane-alcohol mixture, and after the cut pieces of rubber stock were added thereto, the whole was churned at room temperature thoroughly for about 20 hours, until a smooth coatable dispersion was obtained. The dispersion was then coated over the resinous protective layer 13 and dried to a weight of about 2.0–2.5 grains per 24 square inches, after which the tape was slit into half-inch widths and wound upon itself to provide a roll 10 as illustrated in Figure 1 of the drawing.

After being stored in roll form at normal room temperatures for about one week, the tape was unrolled and printed with a legend using a yellow vulcanizable rubberized ink. Labels cut from the tape were then adhered by virtue of the slight tackiness of the rubbery bonding layer 14 to several strips of rubber containing vulcanizing agents. These samples included strips of raw natural rubber and strips of equal parts of natural rubber and Buna–N synthetic rubber (butadiene-acrylonitrile), each such composition being provided in both black and white. The label-bearing strips were then cured in a heated platen press under 125 pounds per square inch, the black strips at 315–320° F. for 15 minutes and the white at 275° F. for 50 minutes. After vulcanization, the cellophane carrier web 11 in each case fell away under simple flexing of the rubber strip to expose the glossy surface of the protective layer 13 through which the inked legend appeared with striking clarity. In spite of the pressure applied in vulcanization, there was no sign of oozing or flowing of either of the layers of the label or of smearing of the inked legend. Deliberate attempts at marring the protective layer 13 with abrasive sheet material were unsuccessful although the unprotected rubber adjacent the layer 13 was scratched thereby. Efforts at peeling away the label structure indicated that removal would be impossible without destroying or defacing that portion of the article to which a label was applied. The total thickness of the label structure comprising the protective layer 13 and the bonding layer 14 was substantially less than 0.001 inch.

Tapes of the above described structure have been stored in roll form of more than nine months without special precautions, after which time they could be unwound without delamination and successfully vulcanizably bonded to rubber articles. They retained good transparency, the ink showing clearly through the glossy protective film. Unprinted label tapes could be printed as readily after such prolonged storage as freshly prepared tapes with equally good end results.

While it is contemplated that the novel label tape will prove to be most useful commercially for labelling uses if marketed without inked indicia, the printing of the tape during its manufacture is not precluded. In such event, it may be more convenient to print with vulcanizable ink directly on the resinous protective film after its formation on the carrier web and prior to coating of the rubbery bonding layer.

The label tape of this invention has particularly merit as a means of color coding rubber articles, such as electric wires and cables. In this use, the rubbery bonding layer may be dyed or pigmented or coloring may be added to the protective film. Where the coding requires more than one color on a single article, two or more differently colored label tapes could be used, or it might be desired to imprint the rubbery bonding layer of a label tape with a plurality of colored inks. Alternatively, the label structure might contain a transparent dye and also be imprinted with a suitably colored ink. Among various colors which have been successfully imprinted on the novel label tapes as vulcanizable rubberized inks are red, blue, yellow and white.

Numerous modifications in the composition of the label tape and a variety of commercial applications will occur to those skilled in the art when apprised of the teachings as herein disclosed. For example, it is not always necessary that the rubbery bonding layer contain vulcanizing agents, since under the conditions of vulcanization, these may migrate from the "green" rubber article to which a label has been applied. For general purposes, coating weights for the rubbery bonding layer of less than about 2.5 grains per 24 square inches are preferred in the practice of this invention, having withstood pressures in vulcanization in the order of 250 pounds per square inch without observable flowing. Heavier coatings may ooze to smear the ink and to produce a dirt-collecting fringe around the glossy protective skin, except in low pressure vulcanization. At coating weights below about 1.5 grains per 24 square inches, the bonding layer lacks the tackiness required to insure that the label tape would remain in place until vulcanization.

It is preferred that the rubbery bonding layer be only slightly tacky, as in the above-described label tape structure wherein 5.5 parts resin per 100 parts rubber were used. At less than about 5 parts resin per 100 parts rubber, using the ingredients of the above-described tape, the bonding layer would lack a desirable degree of tackiness as noted above. Because the elasticity of the bonding layer has a pronounced effect upon the ability of the label to resist abrasion, for optimum results it is preferred that the bonding layer comprise no more than about 10 parts resin per 100 parts of rubber. Moreover, above about 10 parts resin per 100 parts rubber, the bonding layer is somewhat soft and so is less resistant to oozing under vulcanizing pressures.

The label structure could be formed of materials other than those used in the specific tape described above and may be formed by other precedures. Other vulcanizable rubbery polymers and other tackifier resins which do not inhibit vulcanization may be used to form the rubbery bonding layer. Also, label tapes of excellent quality have been prepared in which the protective layer has been cast from a latex. However, when using a butadiene-styrene copolymer, it is preferred that the monomers from which the copolymer is formed consist of at least about 50 percent by weight of styrene since copolymers of lesser styrene proportion lack the desired toughness and abrasion resistance. On the other hand, copolymers of more than about 75 percent styrene with butadiene have a tendency toward brittleness.

Materials other than regenerated cellulose film may be selected for the carrier web within the requirement that the carrier web must not, when subjected to vulcanizing conditions, undergo changes such as charring which might destroy the transparency of the label or otherwise deleteriously affect the resinous protective film. The relatively thick carrier web must also be easily removable subsequent to vulcanization.

It should also be noted that the novel label tape of this invention may be imprinted with a vulcanizable ink other than disclosed above. Included among suitable inks are those disclosed in U.S. Patent No. 2,646,379 issued July 21, 1953 to A. B. Poschel.

What is claimed is:

1. A label tape product capable of accepting printed indicia and of being applied to a vulcanizable rubber article to provide thereon protectively covered permanent markings after vulcanization of said article; said tape product comprising a flexible temporary carrier web and a detachable vulcanizable label structure comprising a thin non-tacky transparent vulcanizable resinous protective layer comprising the copolymer of about 25–50 parts of butadiene and correspondingly about 75–50 parts by weight of styrene, said protective layer being removably adhered to said carrier web, and a thin ink-receptive tacky vulcanizable rubbery bonding layer adhered in turn to said protective layer.

2. A label tape product which is capable of accepting printed indicia and of being applied to a vulcanizable rubber article to provide thereon protectively covered permanent markings after vulcanization of said article and which is capable of being wound upon itself in roll form for storage and transport and of being unwound in condition for printing and application; said tape product comprising a flexible temporary carrier web having a low-adhesion back surface and on the front surface a detachable vulcanizable label structure comprising a thin non-tacky transparent vulcanizable resinous protective layer comprising the copolymer of about 25–50 parts of butadiene and correspondingly about 75–50 parts by weight of styrene, said protective layer being removably adhered to said carrier, and an exposed thin ink-receptive tacky vulcanizable rubbery bonding layer adhered in turn to said protective layer.

3. As an article of manufacture, a rubber article having a surface to which is bonded for marking purposes a label structure which was vulcanized in situ with the rubber article, said label structure comprising a thin transparent abrasion-resistant resinous protective layer comprising the copolymer of about 25–50 parts of butadiene and correspondingly about 75–50 parts by weight of styrene, and a thin rubbery layer bonding said protective layer to said rubber article, said rubbery layer including color contrasting to that of the surface of the rubber article.

4. As an article of manufacture, a rubber article having a surface to which is bonded for marking purposes a label structure which was vulcanized in situ with the rubber article, said label structure comprising a thin transparent abrasion-resistant resinous protective layer comprising the copolymer of about 25–50 parts of butadiene and correspondingly about 75–50 parts by weight of styrene, and a thin rubbery layer bearing colored inked indicia, said rubbery layer bonding said protective layer to said rubber article.

5. The method of making a roll of label tape suitable for providing vulcanizable rubber articles with label markings, which become permanent after vulcanization, and capable of being unwound from roll form in condition for marking with vulcanizable ink and for application to vulcanizable rubber articles, said method consisting essentially of steps of (1) coating the front surface of a temporary flexible carrier web having a low-adhesion back surface with a thin non-tacky transparent vulcanizable resinous protective layer comprising the copolymer of about 25–50 parts butadiene and correspondingly about 75–50 parts by weight of styrene, (2) coating over said protective layer a thin ink-receptive tacky vulcanizable rubbery bonding layer, and (3) winding the thus-formed tape product upon itself for storage and transport.

6. The method of providing the surface of a vulcanizable rubber article with inked indicia essentially coplanar with said surface and substantially permanent in the face of abrasive and weathering action after vulcanization with the rubber article consisting essentially of the steps of (1) marking with vulcanizable ink the exposed surface of a thin transparent ink-receptive tacky vulcanizable rubbery film while the film is supported by a flexible releasable carrier web and adhered thereto by means of a thin coterminous transparent vulcanizable resinous protective layer comprising the copolymer of about 25–50 parts butadiene and correspondingly about 75–50 parts by weight of styrene, (2) laying said exposed inked surface of the rubbery film against said vulcanizable rubber article to adhere the two, (3) subjecting the whole to vulcanizing conditions, and (4) removing the carrier web.

7. A printable label tape product which is capable of accepting printed indicia and of being applied to a vulcanizable rubber article to provide thereon protectively covered permanent markings after vulcanization of said article and which is capable of being wound upon itself in roll form for storage and transport and of being unwound in condition for printing and application; said tape product comprising a flexible temporary carrier web having a low-adhesion back surface and on the front surface a detachable vulcanizable label structure comprising a thin non-tacky transparent vulcanizable resinous protective layer removably adhered to said carrier, and a thin ink-receptive tacky vulcanizable rubbery bonding layer adhered in turn to said protective layer.

8. A label tape product as defined in claim 1 wherein said rubbery bonding layer is imprinted with vulcanizable ink.

References Cited in the file of this patent

UNITED STATES PATENTS

| | | |
|---|---|---|
| 1,496,753 | Burkley | June 3, 1924 |
| 2,188,866 | Poschel | Jan. 30, 1940 |
| 2,229,316 | Van Cleef | Jan. 21, 1941 |
| 2,295,735 | Hurt | Sept. 15, 1942 |
| 2,316,149 | Bates | Apr. 13, 1943 |
| 2,384,039 | Miglarese | Sept. 4, 1945 |
| 2,416,844 | Reese | Mar. 4, 1947 |
| 2,556,078 | Francis | June 5, 1951 |
| 2,627,486 | Smith | Feb. 3, 1953 |
| 2,646,379 | Poschel | July 21, 1953 |
| 2,746,877 | Matthes | May 22, 1956 |

FOREIGN PATENTS

| | | |
|---|---|---|
| 414,205 | Great Britain | Aug. 2, 1934 |